United States Patent [19]
Rothlisberger et al.

[11] Patent Number: 5,213,463
[45] Date of Patent: May 25, 1993

[54] MECHANIZED STORAGE SYSTEM

[76] Inventors: Michel Rothlisberger, 5B/12 Bligh Street, Randwick, NSW 2031, Australia; Herbert Goddard, 1 Lang Avenue, Pagewood, NSW, 2035, Australia

[21] Appl. No.: 623,938
[22] PCT Filed: Jul. 6, 1989
[86] PCT No.: PCT/AU89/00290
§ 371 Date: Dec. 12, 1990
§ 102(e) Date: Dec. 12, 1990
[87] PCT Pub. No.: WO90/00507
PCT Pub. Date: Jan. 25, 1990

[30] Foreign Application Priority Data
Jul. 6, 1988 [AU] Australia ............. 9166

[51] Int. Cl.⁵ .................................. B65G 1/00
[52] U.S. Cl. .................... 414/280; 414/282; 414/661
[58] Field of Search .............. 414/280, 281, 282, 278, 414/661, 662, 663

[56] References Cited
U.S. PATENT DOCUMENTS

| | | | |
|---|---|---|---|
| 3,719,288 | 3/1973 | Schmitt et al. | 414/280 |
| 3,762,531 | 10/1973 | Lee | 414/280 X |
| 3,840,131 | 10/1974 | Castaldi | 414/280 |
| 4,010,855 | 3/1977 | Smith | 414/280 X |
| 4,358,239 | 11/1982 | Dechantsreiter | 414/282 X |
| 4,361,411 | 11/1982 | Di Liddo | 414/280 X |
| 4,462,742 | 7/1984 | Hradel | 414/280 |
| 4,656,949 | 4/1987 | Ragot | 414/280 X |
| 4,756,657 | 7/1988 | Kinney | 414/280 X |
| 4,812,102 | 3/1989 | Smith et al. | 414/280 |
| 4,856,956 | 8/1989 | Zur | 414/280 |
| 5,002,449 | 3/1991 | Kita et al. | 414/280 X |

FOREIGN PATENT DOCUMENTS

| | | |
|---|---|---|
| 461488 | 1/1974 | Australia . |
| 490439 | 12/1976 | Australia . |
| 897699 | 1/1984 | Belgium . |
| 0192259 | 8/1986 | European Pat. Off. . |
| 2743395 | 12/1978 | Fed. Rep. of Germany ...... 414/280 |
| 8805018 | 7/1988 | Japan ............. 414/280 |
| 1175810 | 8/1985 | U.S.S.R. ............. 414/280 |

OTHER PUBLICATIONS
Patent Abstract of Japan M-386, p. 14, JP.A, 60-15302 (Daifuku Kiko K.K.) 26 Jan. 1985.

Primary Examiner—Michael S. Huppert
Assistant Examiner—James T. Eller
Attorney, Agent, or Firm—Beveridge, DeGrandi, Weilacher & Young

[57] ABSTRACT

Two tray-supporting racks are located on opposite sides of an elevator carriage which carries a mechanized retrieving system for withdrawing trays from either rack and delivering them to a work area. The elevator carriage is vertically driven by a motor, sprockets, and chains. A transport chain travels on sprockets mounted on end plates of the elevator carriage. Transport rollers on the chain engage transport blocks on selected trays to produce lateral movement of the trays onto and off of their respective racks.

12 Claims, 11 Drawing Sheets

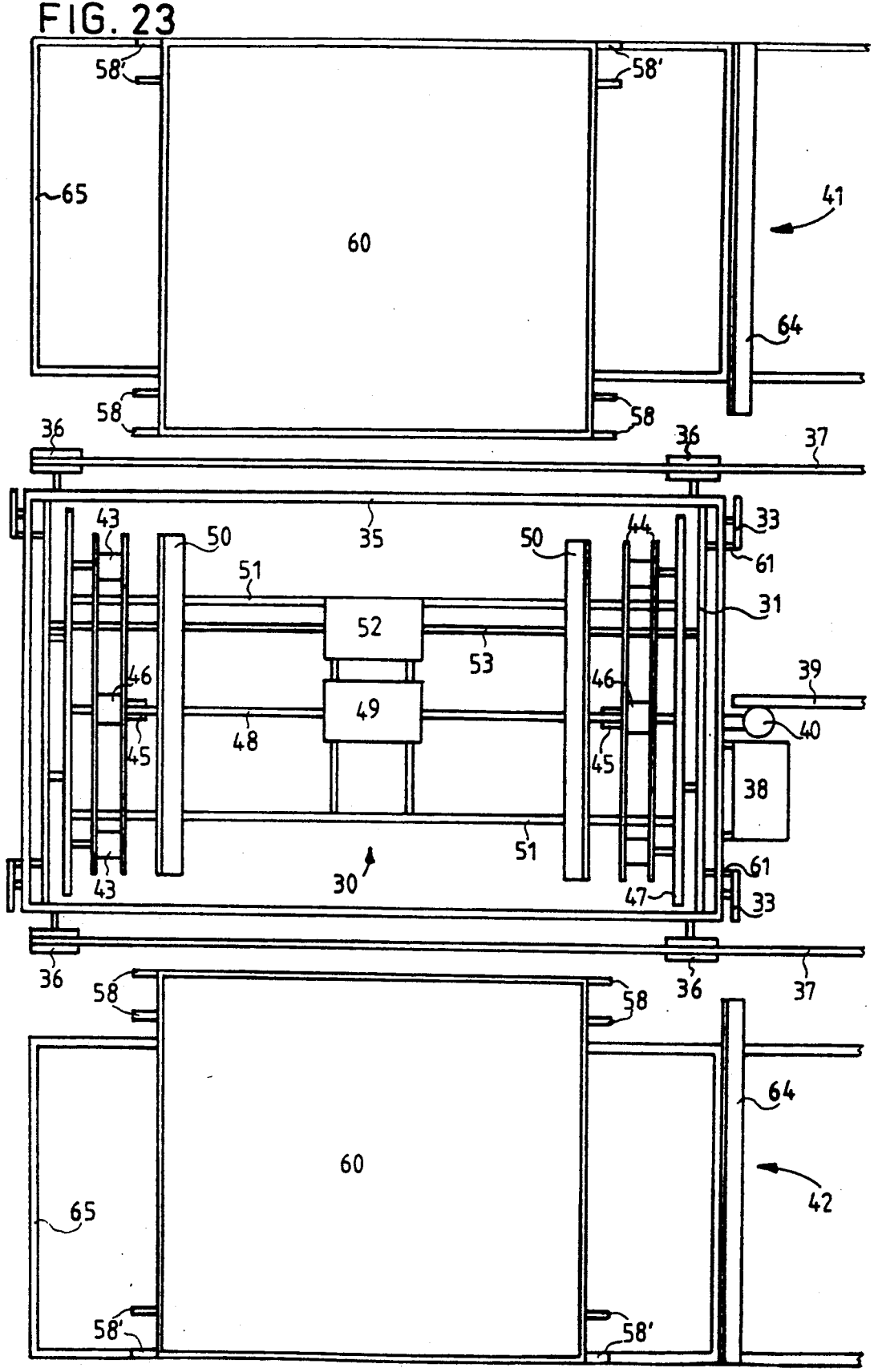

MECHANIZED STORAGE SYSTEM

FIELD OF THE INVENTION

The present invention relates to a mechanised storage system.

The invention particularly, though not exclusively, relates to a system comprising two racks of storage trays which stand one on each side of an elevating mechanism. The elevating mechanism carries a retrieving unit capable of withdrawing and replacing individual trays from either rack and transferring individual trays between a storage location and a working location.

BACKGROUND OF THE INVENTION

Mechanised storage systems are well known in the prior art and are particularly used in warehousing and invoicing control. The mechanical or retrieving device used to address a particular storage location and retrieve a pallet or tray therefrom is generally complex in its mechanical structure and the control thereof. Examples of such prior art systems are described in Australian Patent Specifications 490,439 (81,733/75) in the name of Leif Anderson and 461,488 (44,551/72) in the name of Conco Inc. The Anderson specification describes a complex "transportation device" which transfers a unit load to and from a storage compartment. The transportation device has means to grasp the unit load, tilt the unit load, lift the unit load and move it laterally. A combination of movements is required to move an edge of the unit load onto a roller conveyor before the unit load can be transferred into a storage compartment. Unloading a unit load from a storage compartment entails a reversed sequence of operation. The lateral transfer of the unit load is performed by dogs attached to a chain drive. A pair of dogs are provided at either end of the transportation device to effect transfer in ether lateral direction. The transfer of a unit load requires the operation of at least 3 separate mechanical systems to elevate, tilt and move laterally the unit load.

In the Conco specification a warehousing and invoicing system is disclosed. A stacker crane enables two pallets to be placed side by side. One pallet carries the goods required to fulfill a particular inventory request. The other pallet carries items from which a choice is to be made. Pallets are advanced onto a stacker crane from their selected storage bin by an extensible fork structure while transfers between each of the pallets are made by a pneumatic or vacuum head.

Each of the above systems involve complex mechanical arrangements and complex sequencing of actions to perform an operation.

Another storage system of which the applicants are aware is the use of a carousel to position storage bins at a particular location. At this location the items stored in a storage bin may be removed or otherwise modified in some manner. A typical carousel comprises a number of storage bins carried on a chain about a pair of sprockets. In order to position a particular storage bin the entire collection of storage bins must be moved until the desired bin is positioned at the desired location. Such a system has several disadvantages. In particular, the full weight carried by the chains must be moved requiring large motive power, strengthened components in the chain and sprockets able to withstand these loads and in particular the stresses occasioned when the storage bins circulate over a sprocket. These problems tend to limit the size and capacity of such a system as well as affecting its cost and reliability.

SUMMARY OF THE INVENTION

The present invention seeks to overcome the disadvantages in these prior art systems or at least to substantially ameliorate them by providing a simple and economic storage system.

According to one aspect of the invention there is provided a mechanised storage system including at least one compartment, each compartment capable of storing a movable tray and a transporting system movable adjacent said compartment to retrieve and to move said tray between said compartment and said transporting system, wherein said transporting system includes a retrieving unit having means to move said tray horizontally between said compartment and said retrieving unit in a single continuous movement, said retrieving unit having means to support and locate said tray, said tray having at least one pair of detent means at at least one position upon said tray, and wherein said movement means includes at least one pair of rotary means, each rotary means located substantially at at least one side of and at opposite edges of said retrieving unit facing and obverse to said compartment, loop means driven about said rotary means and means attached to said loop means for engaging one of said detent means, either of said rotary means of said retrieving unit being positionable aligned with said detent means whereby movement of said loop means about said rotary means engages said detent engaging means with said detent means to advance said tray horizontally with respect to said retrieving unit.

According to a further aspect of the invention there is provided a mechanised storage system including at least a pair of racks separated by an aisle, each rack having a plurality of storage compartments, each compartment capable of storing a movable tray and with at least one empty storage compartment in one of the racks, and a transporting system movable along said racks to retrieve and to move a tray between compartments within said racks, wherein said transporting system includes a retrieving unit having means to move a selected one of said trays horizontally between a given compartment and said retrieving unit in a single continuous movement, said retrieving unit having means to support and locate said tray, each of said trays having at least one pair of detent means at at least one position upon said tray, and wherein said movement means includes at least one pair of rotary means each rotary means located substantially at an opposite edge of said retrieving unit facing said racks, loop means driven about said rotary means, and means attached to said loop means for engaging one of said detent means, either of said rotary means of said retrieving unit being positionable aligned with said detent means whereby movement of said loop means about said rotary means engages said detent engaging means with said detent means to advance said tray horizontally with respect to said retrieving unit. Preferably, the rotary means are sprockets and the loop means is a chain but it is contemplated that these means could be a pulley wheel and belt arrangement or similar.

According to a further aspect of the invention a basic unit of the storage system comprises a pair of vertical racks, each rack comprising a plurality of locations, each location capable of accommodating a tray with an elevator carriage capable of transferring trays between any pair of locations, one of which is momentarily empty.

According to a further aspect of the invention increased storage capacity can be provided by extending the basic unit in depth, with the elevator carriage capable of moving both in height and depth.

Other objects and features of the present invention will become apparent from the following detailed description taking in connection with the accompanying drawings which disclose illustrated embodiments of the invention. It is to be understood that the drawings disclosing these embodiments are designed for the purposes of illustration only, and are not intended as a definition of the limits and scope of the invention disclosed therein.

DESCRIPTION OF THE DRAWINGS

Referring to the drawings, wherein similar reference numerals denote similar elements throughout the several views.

FIG. 23 shows a plan view of the embodiment of FIG. 13.

PREFERRED MODES OF PERFORMING THE INVENTION

Figure 1:
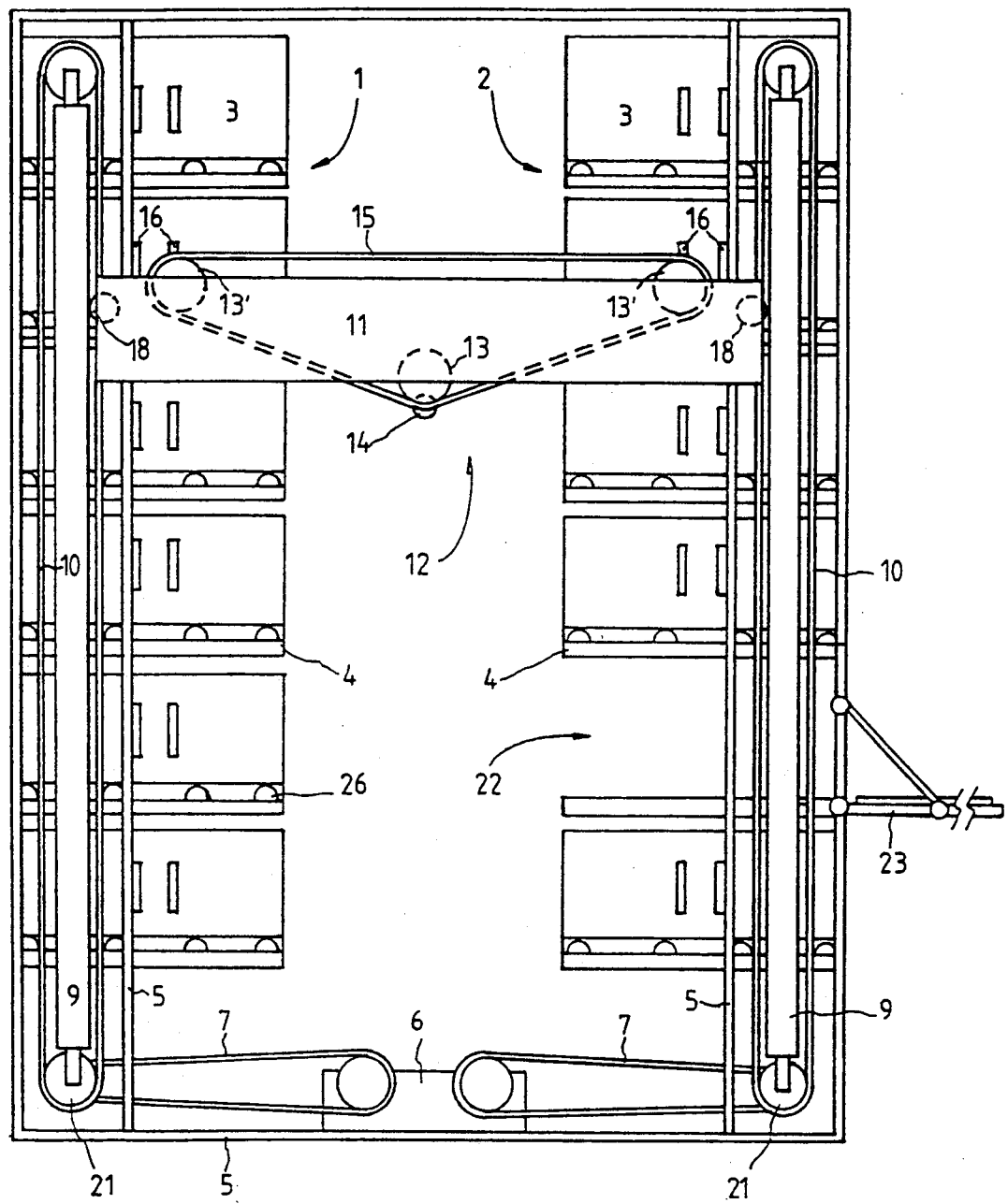
FIG. 1 shows a front schematic view of a first embodiment of the storage system according to the invention.
Figure 2:
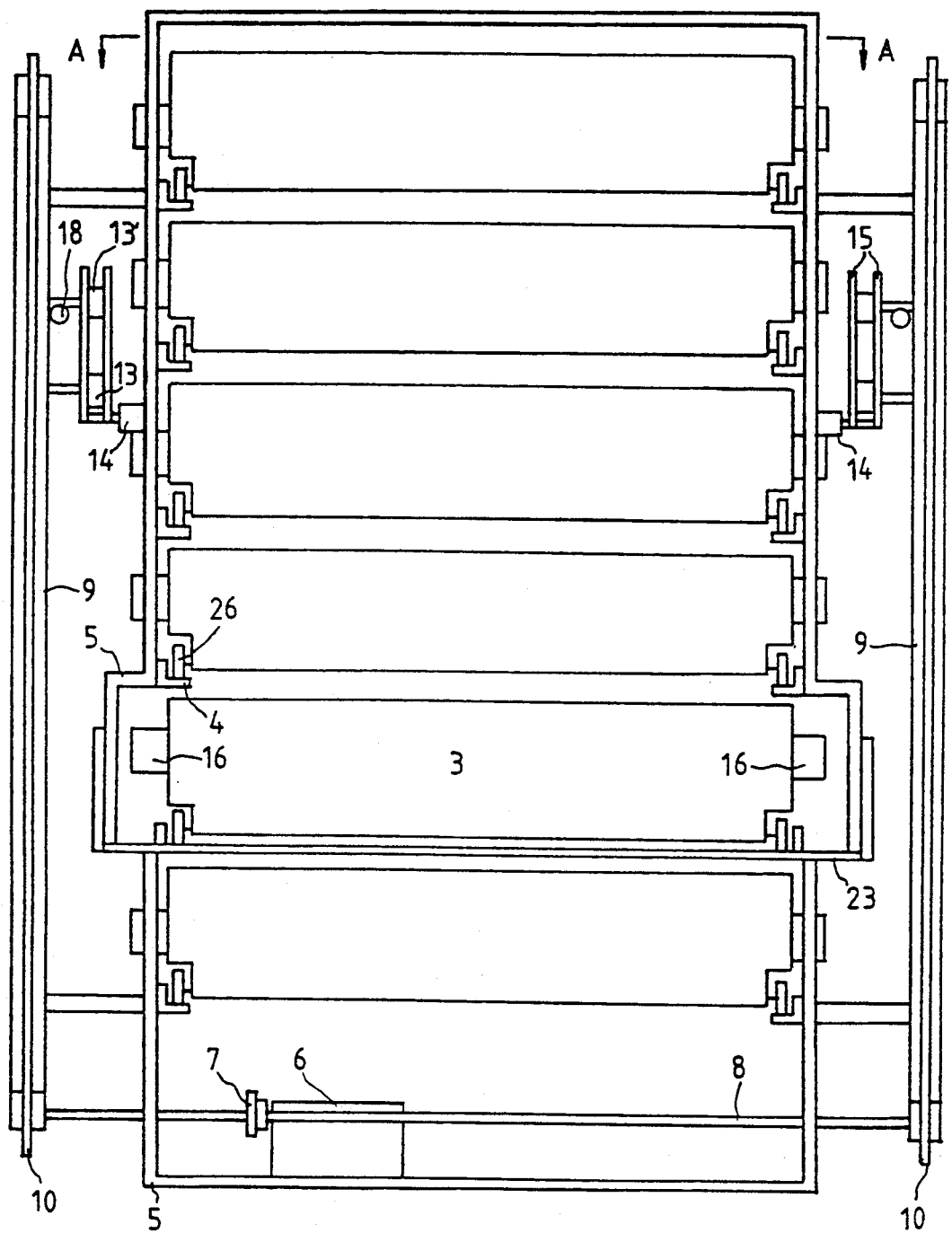
FIG. 2 shows an end view of the embodiment of FIG. 1.
Figure 3:
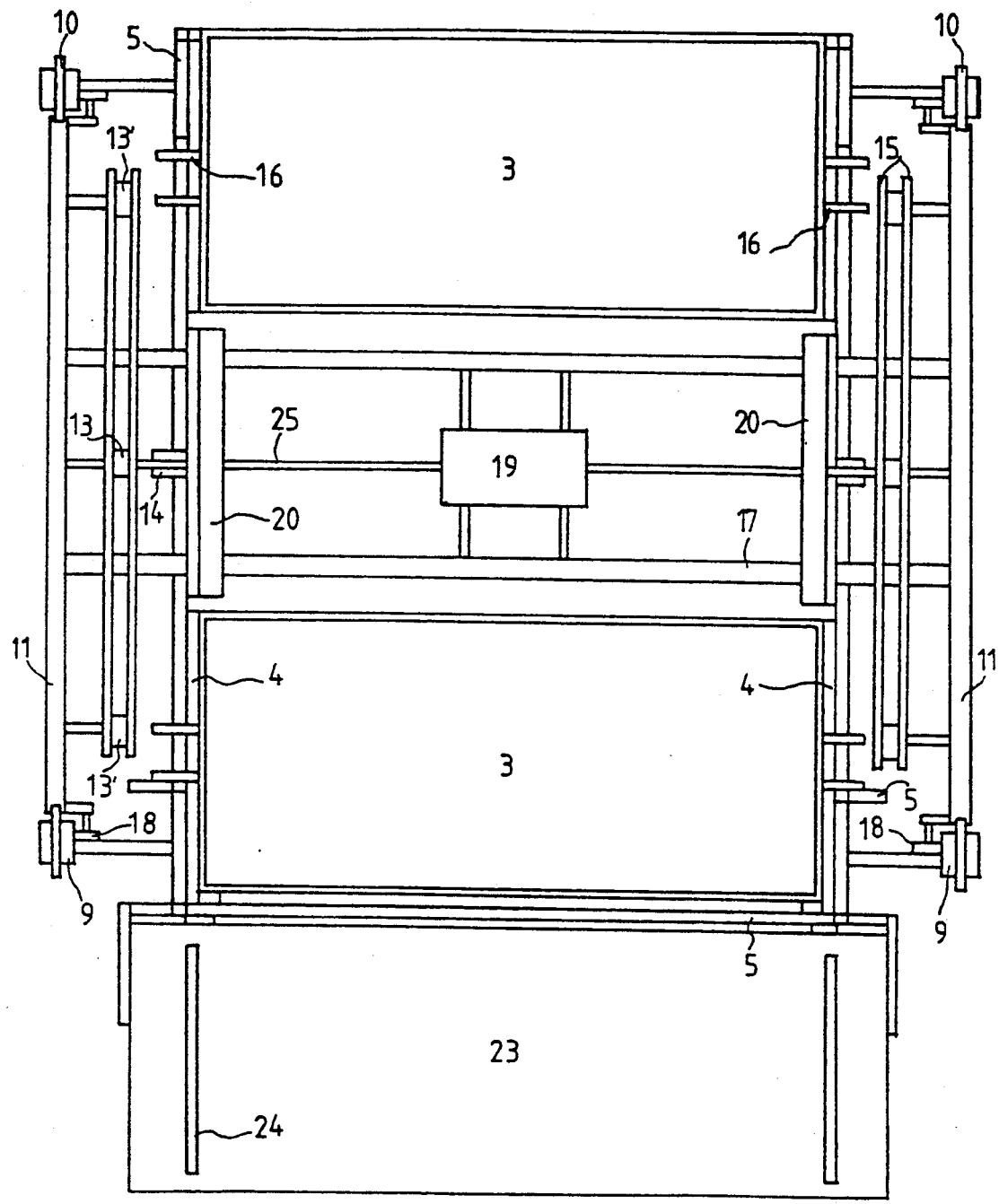
FIG. 3 shows a plan view of FIG. 1 through section A—A as shown in FIG. 2.

A first embodiment of the invention is shown in FIGS. 1-12. In this embodiment a basic storage unit comprises a pair of racks 1, 2 tiered vertically and spaced horizontally from each other. In each rack 1, 2 trays 3 are stored on support members 4 which are fixed to a common frame 5 to form a support for racks 1, 2. An elevator drive unit 6 is mounted on the base of the frame 5, and through chains 7 drives shafts 8 (See FIG. 2) mounted on sub-frames 9.

Figure 4:
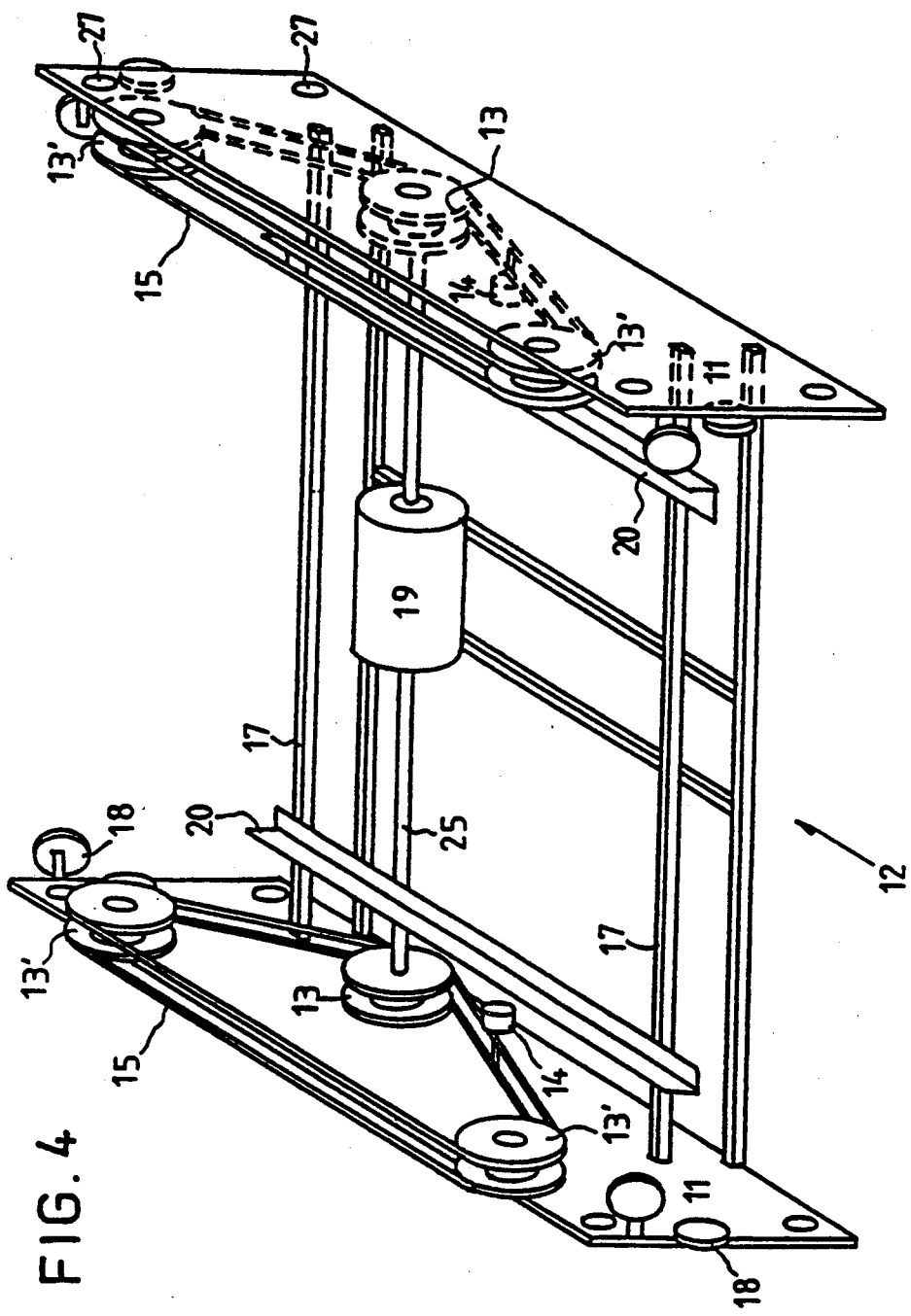
FIG. 4 shows a schematic of the elevator carriage of FIG. 1.

Chains 10 are attached to end plates 11 of elevator carriage 12 and are driven by sprockets 21 on shafts 8 to provide vertical movement of the elevator carriage 12 along the two (2) racks 1, 2. As shown in FIG. 4 the elevator carriage 12 is attached to the chains 10 at points 27.

The elevator 12 comprises a pair of plates 11 joined together by stay bars 17. The carriage 12 is guided within the frame 5 on sub-frame 9 by pairs of rollers 18 at opposite ends of the plates 11. Angle iron members 20 are fixed to stay bars 17 and provide track and support for trays 3 when located on the carriage 12.

Also mounted on end plates 11 are sprockets 13, 13' of the retrieving mechanism of the elevator carriage 12.

Each of the sprockets 13, 13' comprises a pair of sprocket wheels and three (3) sprockets are mounted on each plate 11. Transport rollers 14 are attached to transport chains 15 on either side of the carriage 12. The transport rollers 14 are located on one side and inwardly of the chains 15. Due to the asymmetry of the location of the transport rollers 14 a pair of sprocket wheels are provided for each sprocket 13, 13' and a pair of drive chains 15 to reduce torsional effects when the retrieving mechanism is used. Lateral movement of a selected tray 3 is produced when transport rollers 14 are driven into contact with the transport blocks 16 carried by each tray 3.

The six (6) sprockets 13, 13' and the transport chains 15 are driven by a reversible electric drive unit 19 by way of the shafts 25. Four (4) sprockets 13', two (2) on each plate 11, are mounted on the end plates 11 in such a position that as the transport rollers 14 are advanced on the chains 15 they engage with the transport blocks 16 of the selected tray 3 when each of the trays 3 is in its storage position in the racks 1, 2. The positioning of sprockets 13 enable the drive unit 19 and shafts 25 to be located below the support for the trays provided by members 20. This also makes for a more compact and stable carriage 12 and provides for a better angle of entry to and exit from transport blocks 16 by the transport rollers 14.

One tray location in rack 2 is normally empty. This is designated the work area 22 and is the location into which selected trays 3 can be advanced for performing some function or operation thereon. The work area 22 is provided with a door 23 which remains closed during a retrieval or restore function. The unit as a whole can be fully enclosed within sheet panelling and can be fitted with a lockable door 23 to allow restricted access to the work area 22. The mechanical functions of the unit can be controlled by a programmable logic controller enclosed in a control panel (not shown). The programmable logic controller can be interfaced with a computer to control the unit and in particular to note the stock count held in any of the trays 3. The control of motors 6, 19 to enable the positioning of the elevator carriage 12 at a particular level, to withdraw a given tray 3 and to transfer the tray 3 laterally onto the elevator carriage 12 are not the subject of this invention. A variety of electronic controls can be employed to achieve these features within the knowledge of a person skilled in the art and need not be further described here.

Figure 5:
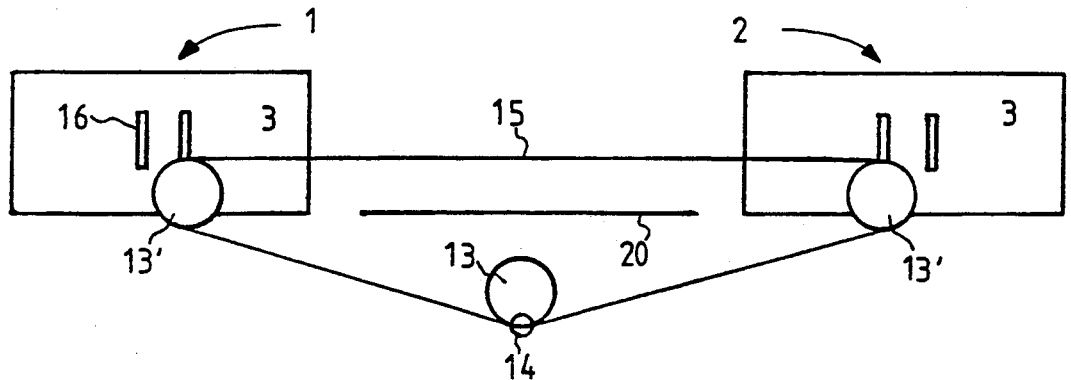
FIGS. 5-12 are schematic illustrations depicting a sequence of transfer operations utilising the embodiment of FIG. 1.

The operation of the retrieval of a tray 3 from a storage location and return from work area 22 will now be described with particular reference to FIGS. 5-12. Motor 6 is activated to move the carriage 12 vertically to the desired tray 3. Thus carriage 12 is positioned with angle irons 20 aligned to receive tray 3 as shown in FIG. 5. The transport blocks 16 comprise a pair of spaced flanges jutting from the mid-point of each of the sides of the tray 3.

Figure 6:
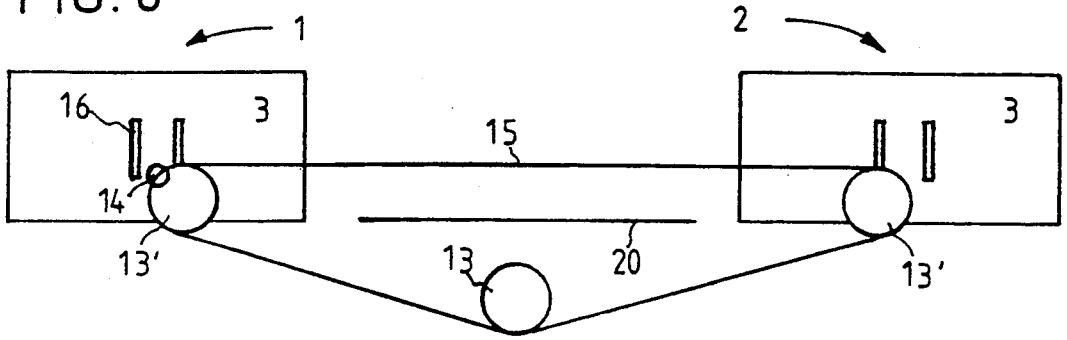
Figure 7:
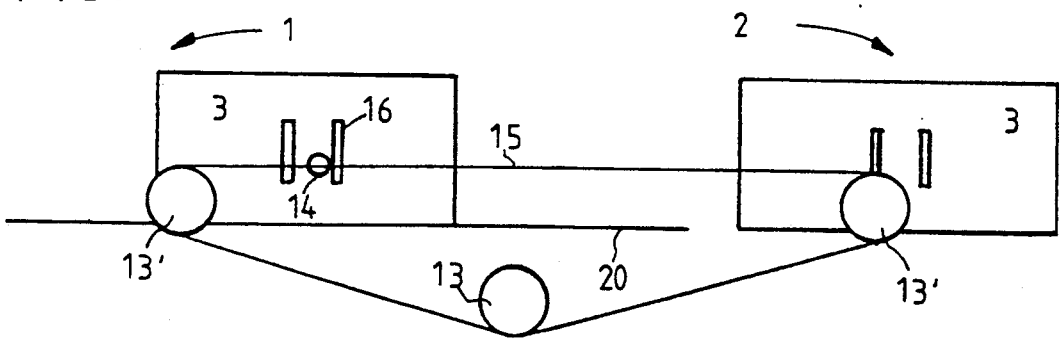

Motor 19 is activated to drive the transport roller 14 in a clockwise sense about the sprockets 13, 13'. Each transport roller 14 is of a dimension smaller than the width of the flanges comprising the transport block 16. As the transport rollers 14 advance to the position as shown in FIG. 6 they will engage the transport blocks 16 and advance in a smooth and continuous action the tray 3 to the right as shown in FIG. 7. As the sprockets 13' are arranged on the carriage 12 in a position coincident (aligned) with the transport blocks 16, the movement of the transport rollers 14 about the sprockets 13' results in a smooth acceleration of the tray 3 as the rollers 14 engage the transport blocks 16. Thus no abrupt change takes place whereby the shock to the chains 15 and the load transmitted to the motor 19 are reduced.

Figure 8:
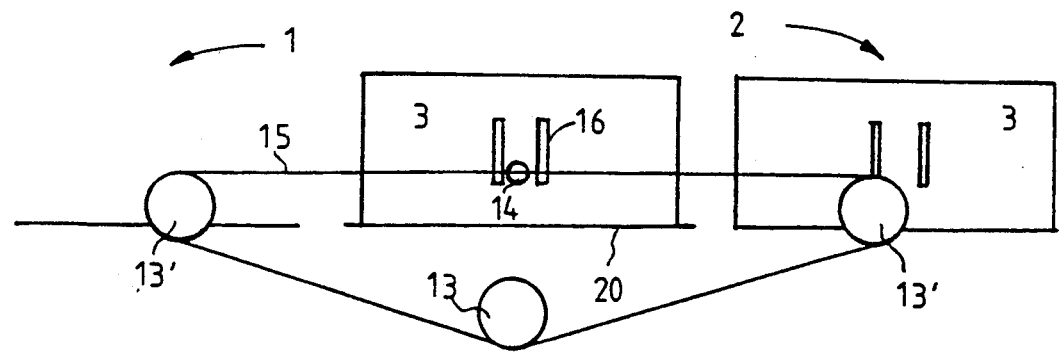

In FIG. 7 the continued clockwise movement of the transport rollers 14 moves the tray 3 until it is centered on the carriage 12 as shown in FIG. 8. The motor 19 is at this point stopped. Normally the location opposite each tray positioned on the rack is occupied, however, if any opposite location is not occupied further movement of the tray 3 can be achieved to position the tray in the unoccupied location. The trays 3 are fitted with wheels 26 for easy movement gauged to fit the angle irons 20 of the carriage 12. Equally the trays 3 could be stored on roller conveyors and the angle irons 20 could be provided with a low friction surface, bearings or the like to facilitate movement of the trays 3.

Figure 9:
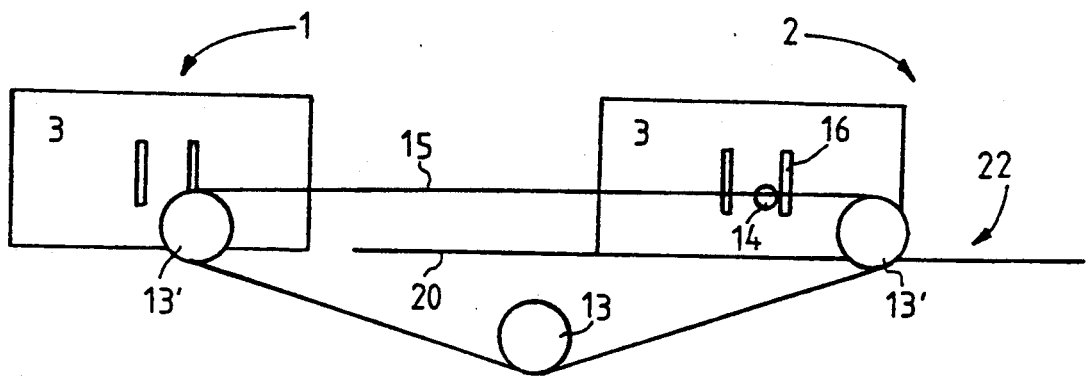
Figure 10:
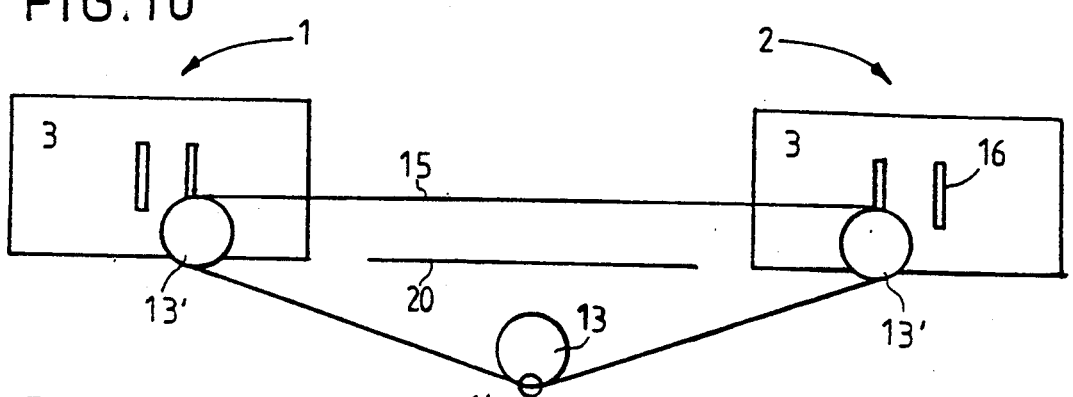
Figure 11:
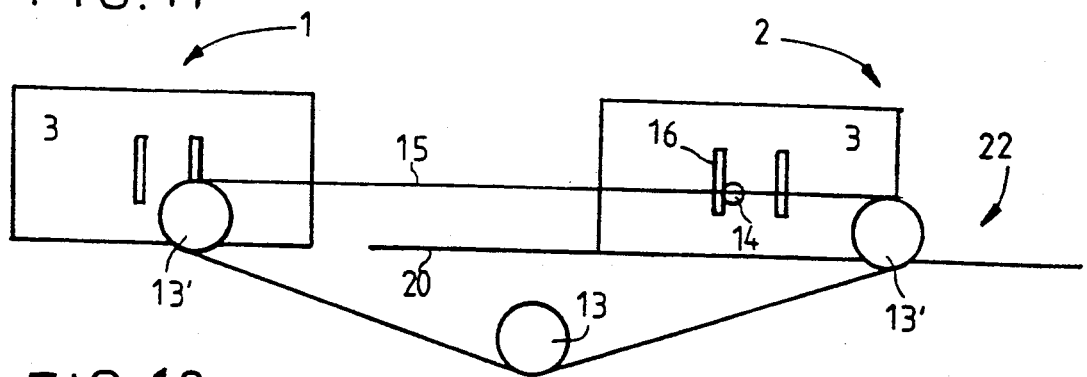
Figure 12:
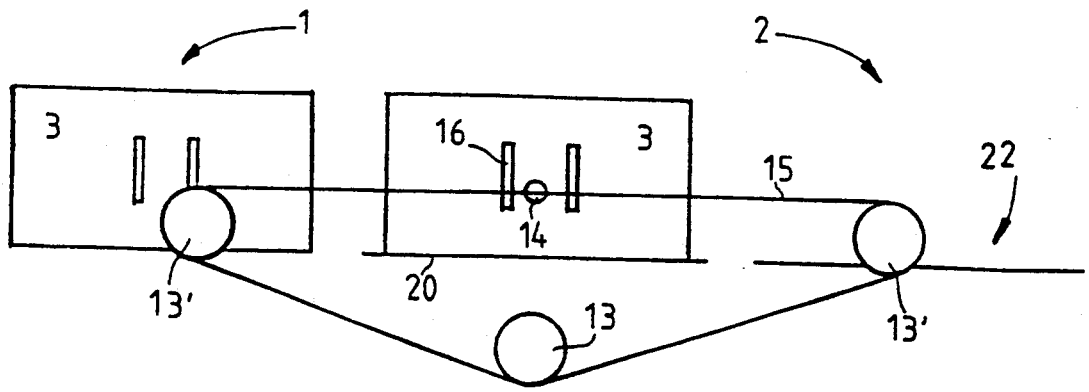

The tray 3 having been positioned centrally on the carriage 12 is now in a position to be moved vertically to, in this case, the work area 22. Therefore, motor 6 is activated to descend the carriage to a position coincident with the work area 22. Once adjacent the work area as shown in FIG. 9 the motor 19 is activated, again to move the chains 15 in a clockwise direction to advance the tray 3 from the carriage 12 to the work area 22. Due to the positioning of the transport blocks 16 and the sprockets 13' the movement of the transport rollers 14 effects movement of the tray 3 to the middle of the work area 22 (see FIG. 10). The transport rollers 14 disengage from the transport blocks 16 as the rollers 14 are driven around the right hand sprockets 13'. During this sequence of operations the door 23 has been retained shut and a simple electrical interlock can be provided to switch off the power to the drive units should this door be opened. Once the tray 3 has been delivered to the work area 22 and upon opening the door 23 the tray 3 can be withdrawn onto support and guide tracks 24 to enable ready access to its contents. Replacing the tray 3 in the work area and closing the door 23 activates power to the motors 6 and 19 to enable the tray 3 to be replaced back in the rack. FIGS. 10-12 show the sequence of operations whereby the tray 3 is positioned on the elevator carriage 12 for return to the position from which it was taken. The programmable logic controller controls the sequence of operations to enable the tray 3 to be returned to its original location or, if required, to any other free location within the racks 1, 2.

As shown in FIGS. 10-12 to move the tray 3 onto the carriage 12 for return to its position in the racks 1, 2 motor 19 is activated to move the chain in a counterclockwise direction as shown in the Figures. The transport rollers 14 therefore engage in the left hand flange of the transport blocks 16 with the same smooth acceleration of the tray 3. Continued motion of the rollers 14 moves the tray 3 onto the carriage 12 where the motor 19 is halted once the tray is centrally positioned on the carriage 12 as shown in FIG. 12.

The elevator carriage 12 can now be moved vertically by the motor 6 to position the tray 3 at the desired location. Depending on whether the tray 3 was derived from the rack 1 or 2 the motor 19 is then activated to move the chains 15 in either a clockwise or counterclockwise sense to move the tray 3 into its required rack position. Clockwise rotation of the motor 19 moves the transport rollers (and thus the tray 3) to the right while counterclockwise rotation of the motor 19 moves the tray 3 to the left. In order to complete the reverse of the sequence of FIGS. 5-8 thus the motor 19 is activated to move the chains 15 in a counterclockwise sense thereby replacing the tray 3 to its original location from which it started as shown in FIG. 5. The fixing of the end plates 11 of the carriage 12 to the chains 10 of sub-frame 9 provides increased stability to the unit and a capacity to handle large loads by the carriage 12.

A second embodiment of the invention will now be described with respect to FIGS. 13-23. In this embodiment a number of vertical racks are arranged side by side increasing the capacity of the basic unit described with respect to FIGS. 1-12. In order to move between the number of vertical racks the elevating carriage must now be located between the racks rather than overlapping the racks as shown in FIGS. 1-12. By this arrangement the embodiment of FIGS. 1-12 can be made more compact in its lateral dimensions.

The same principles of retrieving and elevation are used while improving the storage capacity by providing additional modular units of storage trays. In order to extend the storage system in depth, the transport system of the basic unit of FIGS. 1-12 is modified by being mounted on a framework guided and supported by wheels running on rails fitted top and bottom of the main frame and between the banks of trays. Longitudinal movement of the transportation system would be achieved by a rack and pinion drive.

Figure 13:
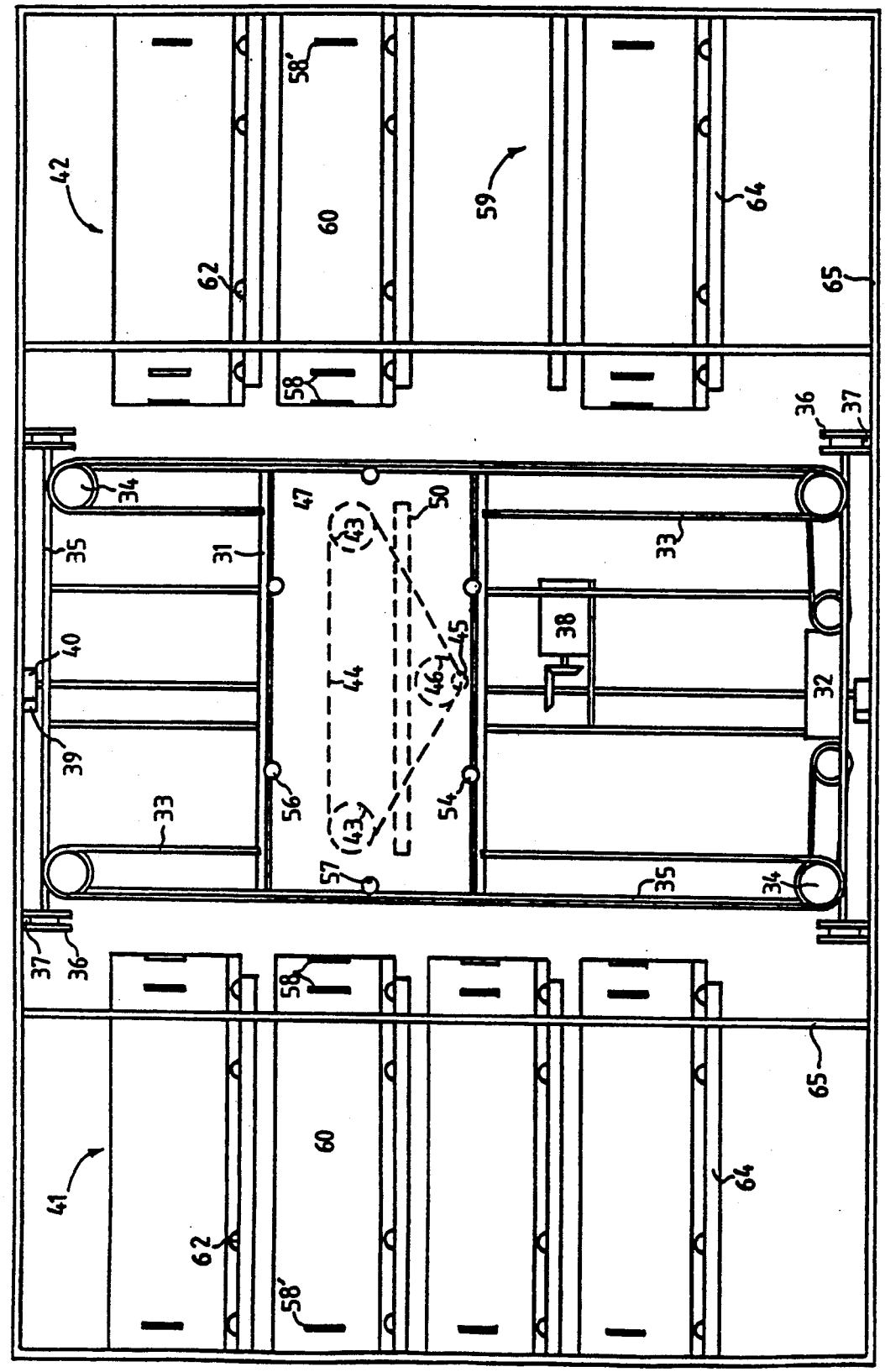
FIG. 13 shows a schematic end view of a second embodiment of the storage system according to the invention.
Figure 14:
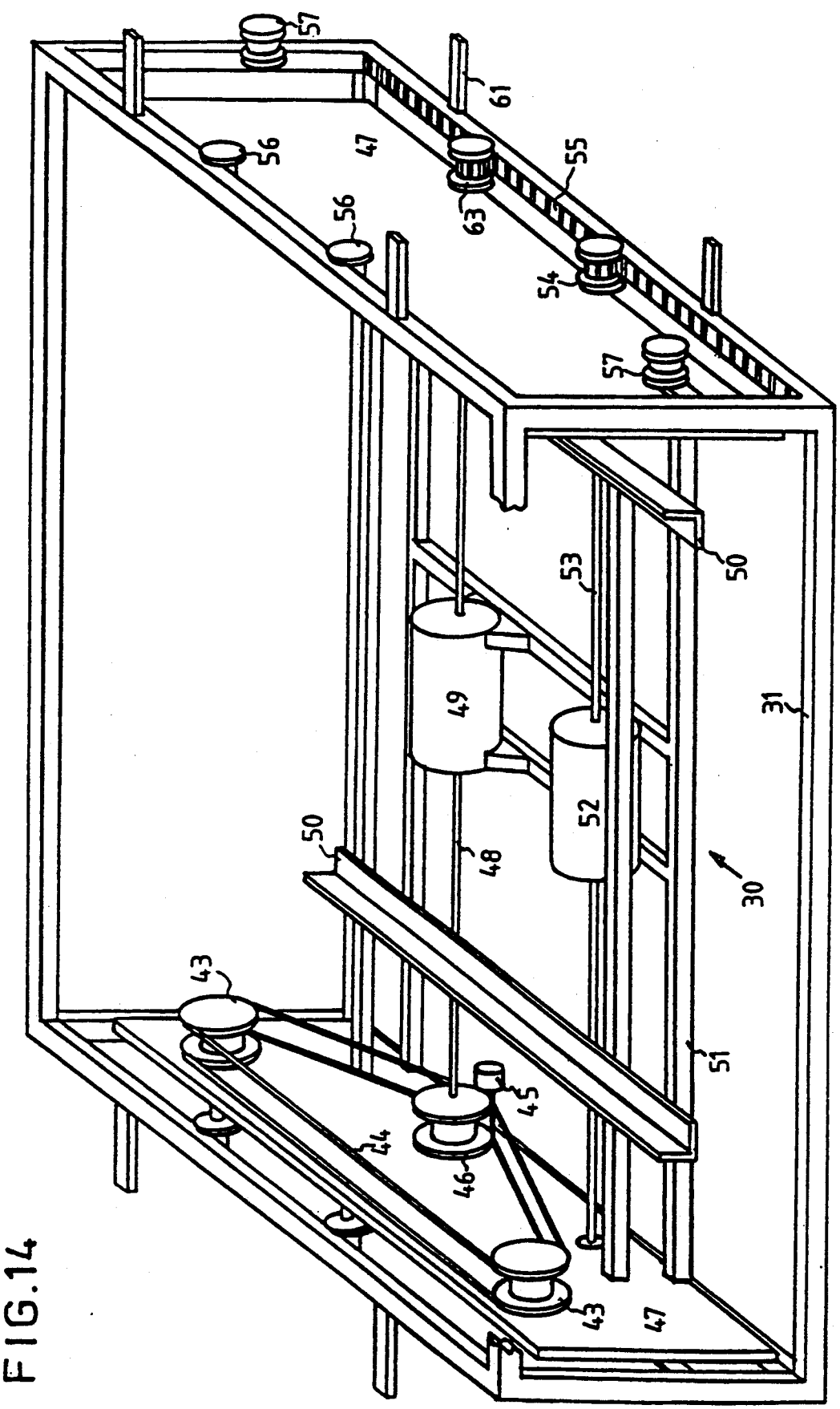
FIG. 14 shows a schematic view of the elevator carriage used in the system of FIG. 13.

As the elevator carriage has now to be located between the banks of storage trays a further lateral displacement drive must be provided in order to advance the carriage to bring the retrieval mechanism into its operating position. In order to achieve this the retrieving unit 30 is mounted on the elevator carriage 31 and is driven by means of a rack and pinion as will be described more fully below as shown in FIGS. 13 and 14. In the embodiment of FIGS. 1-12 the elevator carriage 12 corresponds to the retrieving unit 30.

The drive unit 32, the elevating chains 33 and sprockets 34 are mounted on a framework 35. The wheels 36 support and guide the framework 35 on rails 37 while drive unit 38, racks 39 and pinions 40 provide for longitudinal movement of the framework 35 between the racks of trays 41 and 42. The retrieving unit 30 includes sprockets 43 and 46 which are mounted on the end plates 47 and drive shafts 48 respectively. Shafts 48 are driven by motor 49 and are supported on the end plates 47 and carry sprockets 46 to drive the chains 44. The transport rollers 45 are fitted to the chains 44 as before. As for the previous embodiment the postitioning of sprockets 46 enables the motor 49 and shafts 48 to be located below the tray supports provided by members 50. This also makes for a more compact and stable retrieving unit 30 while providing for a better angle of entry to and exit from the transport blocks 58, 58' by the transport rollers 45. Angle iron members 50 are fixed to stay bars 51 and provide track and support for trays in transit much as described with respect to FIGS. 1-12 for the carriage 12.

In addition motor 52 drives pinion shafts 53 and flange pinions 54 running on racks 55 mounted to the frame of the elevator carriage 31. The components 52-55 provide lateral movement of the retrieving unit 30. Guide rollers 56 and support pinions 63 are mounted on the end plates 47 and guide rollers 57 are mounted on the frame of the elevator carriage 31 to control clearance within the frame 35.

Lugs 61 are provided on the elevator carriage 31 to attach the carriage 31 to the elevating chains 33 to provide vertical movement of the carriage 31.

Trays 60 are fitted with wheels 62 and stored on support members 64 of frame 65.

The transport blocks 58, 58' of a tray 60 are provided at the opposite ends of the trays 60. Each of the transport blocks 58, 58' comprises a pair of spaced flanges jutting from the sides of the trays 60. This positioning of the transport blocks 58, 58' is required due to the changed dimensions of the retrieving unit 30. As before a work area 59 is provided to which the trays 60 are to be moved.

The sequence of operation to retrieve and restore a tray 60 is shown with respect to FIGS. 15-22 and will now be described with respect thereto.

Figure 15:
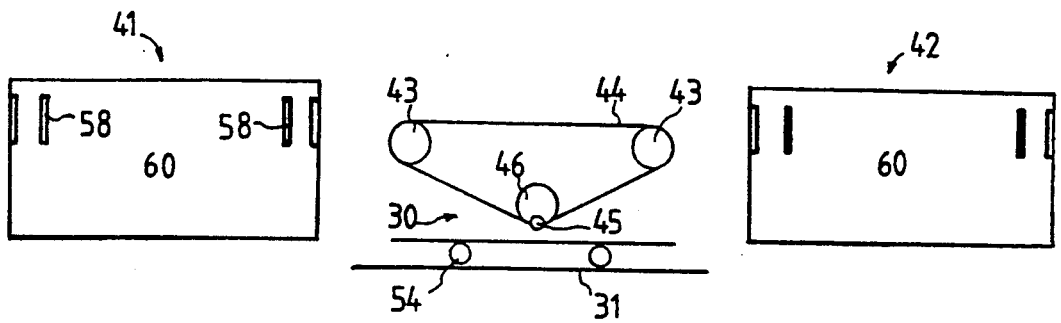
FIGS. 15-22 shows schematic illustrations of a sequence of transfer operations according to the embodiment of FIGS. 13 and 14.
Figure 16:
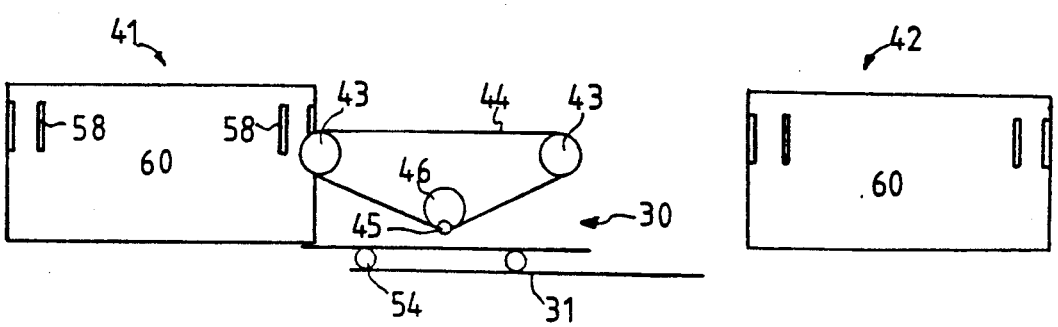

The elevator carriage 31 is moved to the required location as shown in FIG. 15. The motor 52 is now activated to advance the retrieving unit 30 to a position adjacent the tray 60 as shown in FIG. 16. The motor 49 is now activated to drive the sprockets 46 advancing the chains 44 and rollers 45 in a clockwise sense.

Figure 17:
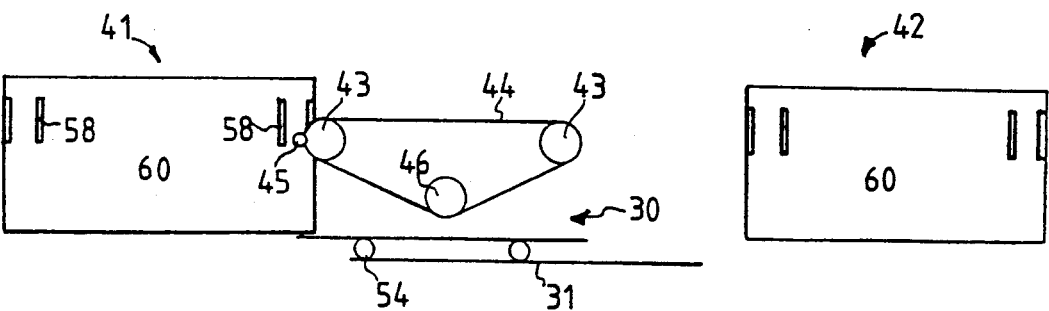

Once the transport rollers 45 engage the transport blocks 58 as shown in FIG. 17 the tray 60 is advanced to the right onto the retrieving unit 30. Due to the location of the transport blocks 58 the transport rollers 45 will advance the tray 60 until it is centrally located on the retrieving unit 30, where the transport rollers 45 will disengage from the transport blocks 58. The tray 60 is thus left in the position shown in FIG. 18 and the motor 49 is now stopped.

Figure 18:
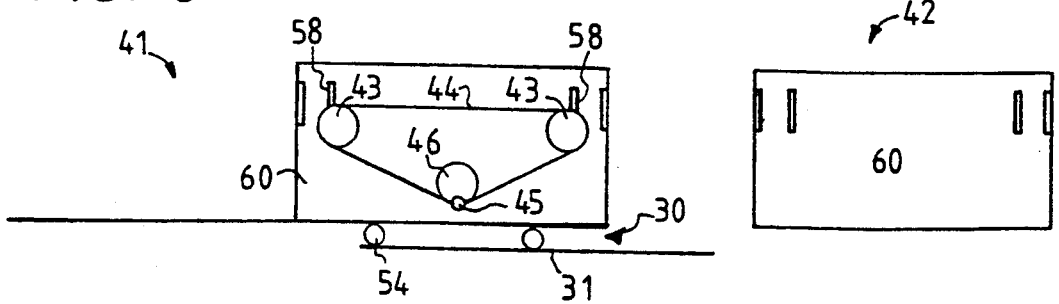
Figure 19:
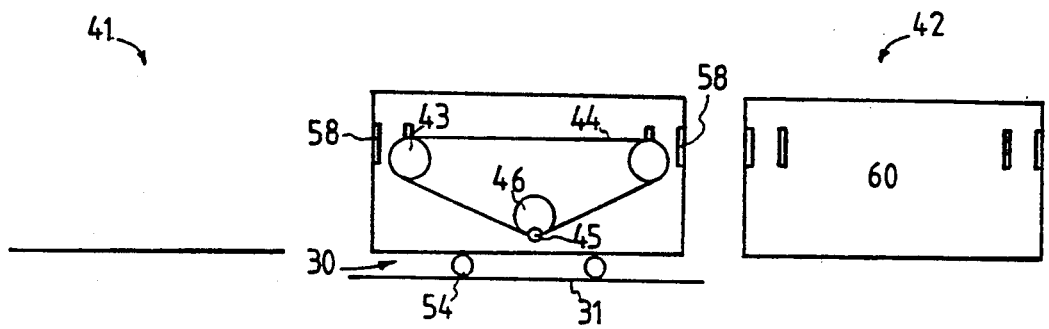

The motor 52 is now engaged to drive the retrieving unit 30 to the right as seen in FIG. 18 until the retrieving unit 30 is positioned centrally of the elevator carriage 31, which is the position shown in FIG. 19.

Figure 20:
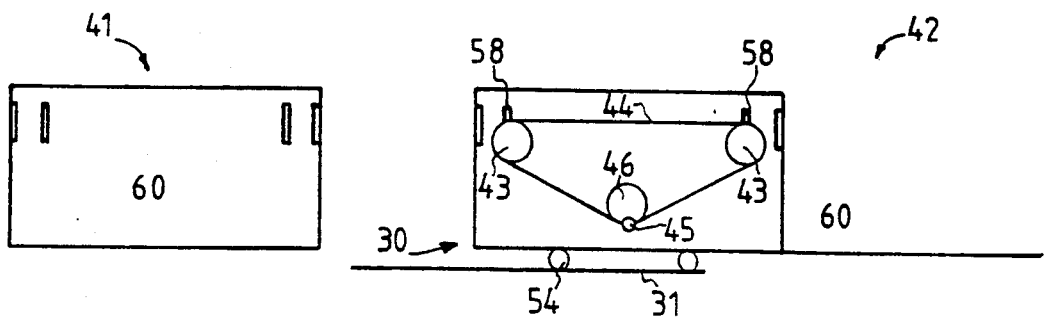
Figure 21:
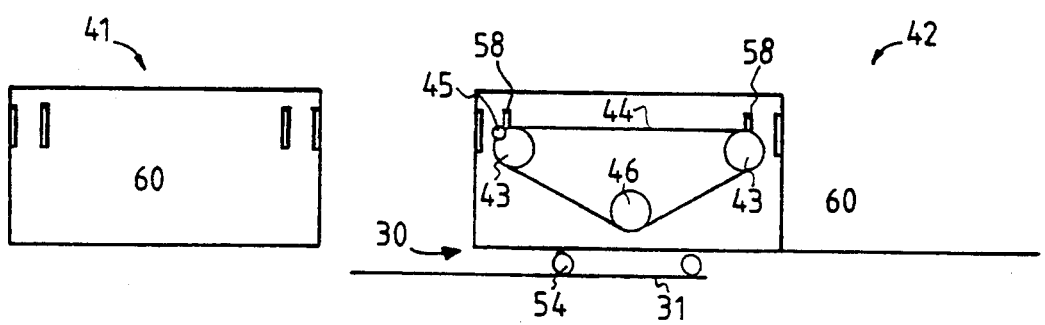
Figure 22:
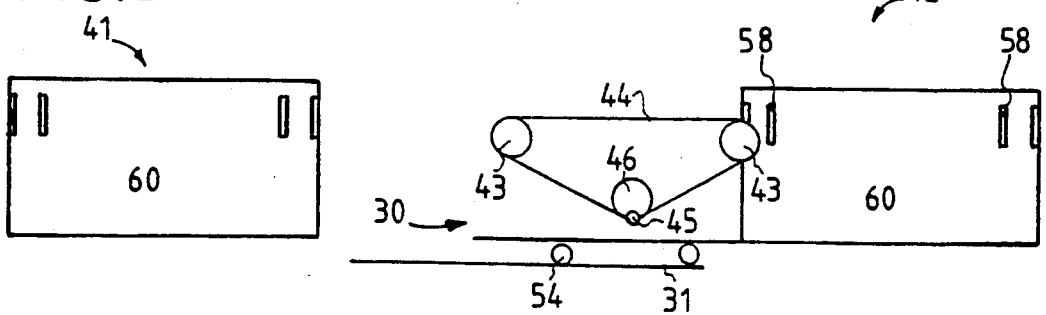

The elevator carriage 31 can now be moved vertically and/or horizontally to the work area 59 where the tray 60 can now be moved into the work area 59 by the sequence of operations as shown with respect to FIGS. 20-22.

Once the elevator carriage 31 is opposite the work area 59 the motor 52 is activated to move the retrieving unit 30 to a position adjacent the work area 59 as shown in FIG. 20. The motor 49 is now activated to drive the transport rollers 45 in a clockwise sense to engage the transport blocks 58' which are located at the opposite end of the tray 60 to the transport blocks 58, as shown in FIG. 21.

Further clockwise rotation of the motor 49 drives the tray 60 further to the right into the work area 59 as shown in FIG. 22. As before the transport rollers 45 disengage from the transport blocks 58' leaving the tray 60 positioned within the work area 59.

The contents of the tray 60 can now be accessed as required through the door (not shown) as before. Once the tray is returned to the work area 59 a reverse sequence of operations can be performed to return the tray 60 to is original location, or some other empty location within the set of racks.

Thus to advance the tray 60 to the left, to complement the sequence of operations depicted in FIGS. 15-22, the motor 49 is now activated to move the transport rollers 45 in a counterclockwise sense then the motor 52 is operated to place the retrieving unit 30 centrally on the carriage 31.

The movement along the stacks of racks 41, 42 is performed by the motor 38 while the vertical movement of the carriage 31 is provided by the motor 32. A programmable logic controller is provided as before to sequence the operations described above. Equally a microcomputer or other control device can be provided and programmed or otherwise controlled automatically or by an operator within the knowledge of a person skilled in the art.

As shown in the above embodiments trays 3, 60 have the general form of bins occupying compartments of the racks 1, 2. It is also contemplated that the trays could be simply channel members designed to receive pallets which in turn are placed on the trays via door 23 by a forklift mechanism.

The location of door 23 can be chosen to suit a given application with the base of the unit above or below ground level, at a convenient operating height depending on the size and function of the system.

The transport rollers 14, 45 in co-operation with the transport blocks 16, 58, 58' provide for positive positioning of the trays 3, 60 whether in the racks or on the carriage 12, or retrieving unit 30. Other means can also be provided to improve the positioning of the trays in the racks. For example, the support tracks 24, 64 can have stop or detent members at their remote ends to keep or locate the trays within the frame. Equally the frame may have rubber (or other resilient material) buffers to engage one side of the transport blocks and prevent overrun or to locate the trays more precisely within the compartments of the racks.

The trays 3, 60 are shown with four (4) pairs of wheels 26, 62, two pairs symmetrically placed either side of the centre, at opposite ends of the trays. This arrangement allows at least three (3) wheel pairs to be in contact with the tracks 24 (64) of the racks or the support members 20 (50) of the carriage 12 (retrieving unit 30) at all times to support the weight of a tray during movement of the trays between the racks and the carriage 12 (retrieving unit 30).

Though the invention has been described above with respect to several embodiments of the invention the invention is not limited thereto and other variations are contemplated within the knowledge of a person skilled in the art.

We claim:

1. A mechanized storage system including at least a pair of storage racks separated by an aisle, each rack having a plurality of storage compartments, a plurality of movable trays, each compartment capable of storing a movable tray, at least one empty storage compartment in one of the racks, and a transporting system movable along said racks to retrieve and to move a tray between compartments within said racks, wherein said transporting system includes a retrieving unit having movement means to move a selected one of said trays horizontally between a given compartment and said retrieving unit in a single continuous movement, said retrieving unit having tray support means to support and locate said tray thereon, each of said trays having front and rear sides joined by lateral sides and at least a pair of detent means on at least one lateral side of said tray, and wherein said movement means includes a first pair of sprockets having horizontal axes of rotation, each sprocket located substantially at opposite edges of said retrieving unit facing said racks, chain means driven about said sprockets, and means attached to said chain means for engaging one of said detent means, either of said sprockets of said retrieving unit being positionably alignable with a said detent means whereby movement of said chain means about said sprockets engages said detent engaging means with said detent means to advance said tray horizontally with respect to said retrieving unit.

2. A mechanized storage system as claimed in claim 1 wherein said movement means includes a second pair of sprockets, and an associated chain means, said first and second pairs of sprockets being located on respective opposite longitudinal sides of said retrieving unit, and a second pair of detent means on the other lateral side of said tray.

3. A mechanized storage system as claimed in claim 2 wherein each sprocket comprises two coaxial sprocket wheels, said chain means comprises a pair of chains, each chain driven by respective ones of said sprocket wheels, and said detent engaging means comprises a transport roller fixed to said pair of chains.

4. A mechanized storage system as claimed in claim 3 wherein said movement means includes two further pairs of coaxial sprockets driving said chain means, each pair of said further pairs located at opposite longitudinal sides of said retrieving unit below said tray support means, substantially coplanar with said first and second pairs respectively, and means to rotate each of said further pairs.

5. A mechanized storage system as claimed in claim 4 wherein said transporting system further includes a carriage means having retrieving unit support means to support said retrieving unit and means to translate said retrieving unit relative thereto.

6. A mechanized storage system as claimed in claim 5 wherein said translating means includes a carriage rack on each side of said retrieving unit support means and a pinion on each side of said retrieving unit.

7. A mechanized storage system as claimed in claim 5 further including a plurality of pairs of racks, each pair arranged side by side, with said transporting system able to move between each pair of said racks along said aisle, and further including means to move said transporting system with respect to said racks in directions substantially perpendicular to said horizontal movement of said retrieving unit comprising chain and sprocket means to move said transporting system vertically along each of said pair of racks, and rack and pinion means to move said transporting system horizontally across said pairs of racks.

8. A mechanized storage system as claimed in claim 7 wherein said detent means comprises pairs of spaced flanges, two pairs extending from each lateral side of said trays with each pair of flanges positioned adjacent an edge of each lateral side thereof.

9. A mechanized storage system as claimed in claim 8 wherein each of said trays is supported on wheels.

10. A mechanized storage system as claimed in claim 4 further including means to move said transporting system along said storage racks in a vertical direction substantially perpendicular to said horizontal movement of said retrieving unit comprising second chain and sprocket means attached to said transporting system.

11. A mechanized storage system as claimed in claim 10 wherein said second chain and sprocket means are located in line with and on either side of each of said storage racks, said sprockets of said transporting system are aligned with said detent means and said detent means are a pair of flanges located centrally on each lateral side of a said tray.

12. A mechanized storage system as claimed in claim 11 wherein each of said trays is supported on wheels.

* * * * *